Sept. 6, 1960     C. L. LONGMIRE     2,951,987
CONSTANT DELAY CIRCUIT

Filed Nov. 14, 1945     2 Sheets-Sheet 1

INVENTOR
CONRAD L. LONGMIRE
BY
*Ralph L. Chappell*
ATTORNEY

Sept. 6, 1960　　　　　　C. L. LONGMIRE　　　　　　2,951,987
CONSTANT DELAY CIRCUIT
Filed Nov. 14, 1945　　　　　　　　　　　　　　2 Sheets-Sheet 2
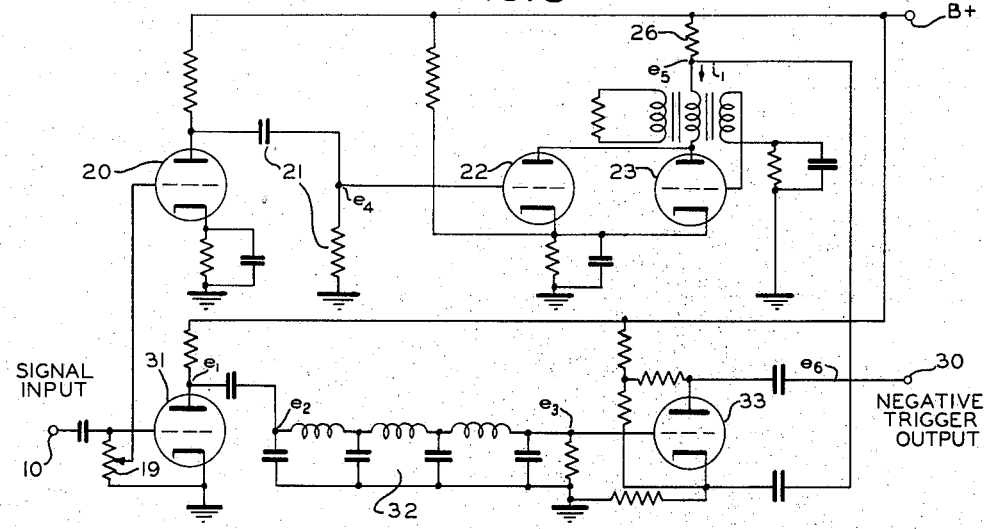
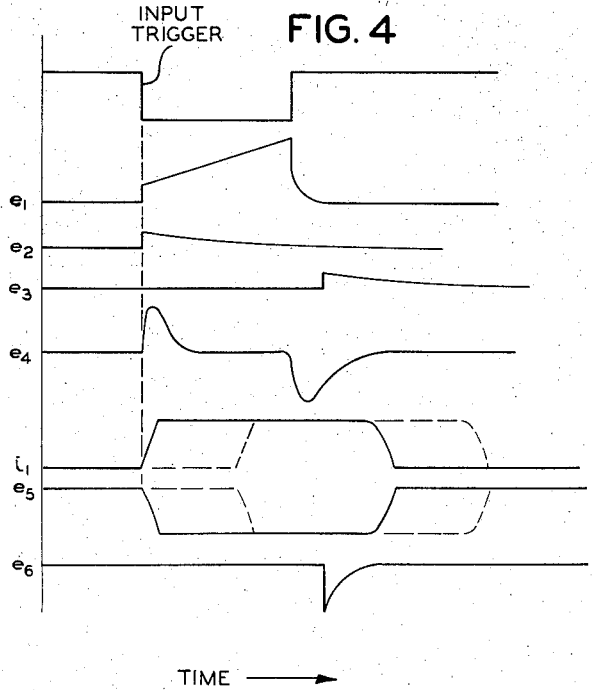
INVENTOR
CONRAD L. LONGMIRE
BY
*Ralph L Chappell*
ATTORNEY

United States Patent Office 2,951,987
Patented Sept. 6, 1960

2,951,987
CONSTANT DELAY CIRCUIT

Conrad L. Longmire, Boston, Mass., assignor, by mesne assignments, to the United States of America as represented by the Secretary of the Navy Filed Nov. 14, 1945, Ser. No. 628,604

3 Claims. (Cl. 328—36)

This invention relates to constant delay circuits, particularly those producing a constant delay between the input and output triggers over a wide range of variation in the amplitude of the input trigger.

In certain electrical apparatus, such as beacons, it is essential that the time relationship between the input and output signals be definite irrespective of the amplitude of the input signal. A beacon is ordinarily triggered by the transmitter pulse from a radar transmitter to transmit a reply pulse which is in turn received by the radar receiver. The direction of the beacon will be established from the azimuth of the radar antenna, which is ordinarily directional, when the beacon pulse is received. The distance to the beacon will be established by the elapsed time from the transmission of the radar pulse to the reception of the beacon pulse with due regard for the known delay existing in the beacon. Obviously, if the distance to the beacon is to be accurately determined, it is necessary that the delay between the input and output signals at the beacon must remain a fixed value. Another disadvantage of variable delay with change of amplitude is a distortion of the reply presentation.

Manifestly somewhere in the beacon circuit, there must be a trigger circuit which gives out a trigger of constant amplitude although functioning on a signal of varying amplitude. This trigger circuit determines the threshold of the beacon, and it also determines the constancy of delay in the beacon. As the input trigger to a trigger circuit decreases in amplitude and crosses the threshold level, the delay of the output trigger increases by a finite amount before it disappears entirely. In ordinary multivibrator and blocking oscillator circuits this shift is likely to be as large as a microsecond.

The present invention solves the problem here considered by placing in parallel with the trigger circuit an amplitude-discriminating circuit. The threshold level of the amplitude-discriminating circuit is far enough above the threshold level of the trigger circuit that the lower extremity of signal amplitude for which the amplitude-discriminating circuit will allow an output from the trigger circuit does not reach the region of signal amplitude in which a variation of this amplitude as seen by the trigger circuit will cause a variation in the time interval between input and output triggers.

An additional requirement of a beacon is that it only trigger when properly interrogated by a radar. Triggering in response to atmospheric noise, while it does not introduce any errors in the radar presentation because the replies are not synchronized, does render less useful the beacon response because such triggering can cause count down if it, the random triggering, occurs at too high a rate. Count down is the inability of a beacon to recover from a random trigger pulse in time to reply to a regular interrogation—consequently the radar does not see a reply for every interrogating pulse and the presentation will be seriously weakened. A beacon should, therefore, have a minimum threshold voltage, and it should not trigger in response to voltages below this value. This has the disadvantage of reducing the sensitivity of the beacon if this minimum voltage is sufficiently high to exclude random noise voltages. Atmospheric noise is usually of short duration in comparison to the pulse widths used in present day radars. A portion of the disclosed embodiment takes advantage of this difference by incorporating a circuit which prevents the beacon from triggering in response to a pulse of a width less than a predetermined value, regardless of its amplitude.

An object of this invention is to provide a beacon which will maintain a constant time interval between input and output pulses regardless of the amplitude of the interrogating pulse.

Another object of this invention is to provide a beacon which, in the choice of interrogating pulses to which it will respond, will be selective with respect to both the amplitude and the duration of the interrogating pulse.

These and further objects will be more evident upon consideration of the description which follows and the accompanying drawings of which:

Fig. 3 is a circuit diagram of a second embodiment of this invention; and

Fig. 4 is a diagram portraying the pertinent wave forms of the circuit disclosed in Fig. 3.

Figure 1:
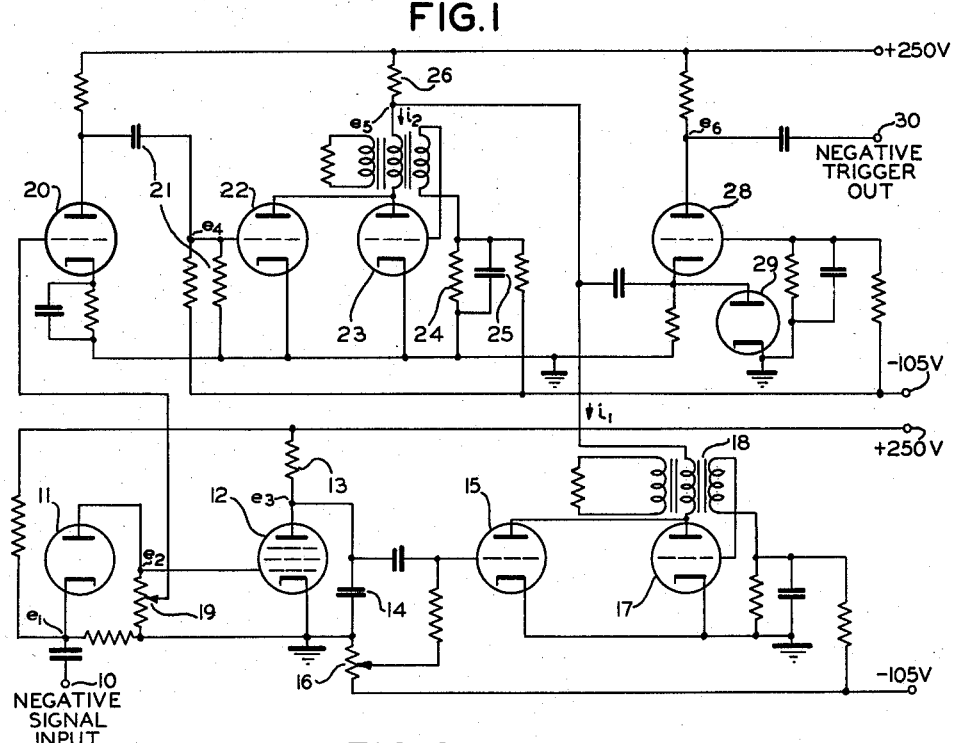
Fig. 1 is a circuit diagram of an embodiment of this invention.
Figure 2:
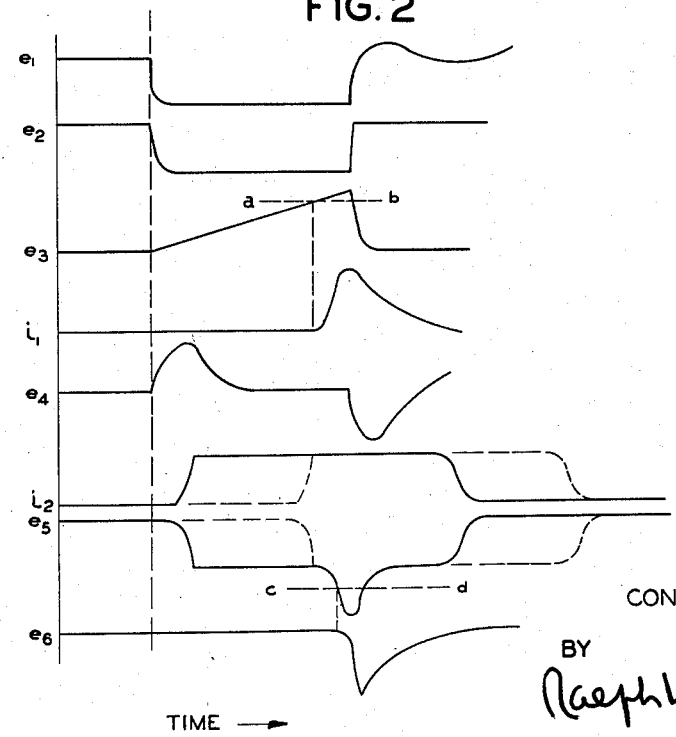
Fig. 2 is a diagram portraying the pertinent wave forms of the circuit disclosed in Fig. 1.

In Fig. 1 is disclosed an embodiment of the invention which may be used in conjunction with microwave beacons of known type. In such a beacon the receiver is followed by a pulse length discriminator, whose function is to differentiate between a signal not intended to trigger the beacon and one that is. This differentiation is based on the width of the trigger pulse. A pulse below a predetermined width, ordinarily two microseconds, should not trigger the beacon and one above that width should. The lower part of the circuit in Fig. 1 is the usual pulse length discriminator, while the upper part is an amplitude-discriminating circuit which is added to insure constant delay. A negative signal from the receiver is impressed on terminal 10 and is then passed through a diode limiter circuit comprising diode 11, the cathode of which is positively biased. This limiter circuit removes positive overshoot by its rectifying action and removes a part of the baseline noise by the positive bias of its cathode. In Fig. 2, which shows the more important wave forms arising in the circuit, the input and output voltage of the diode at points identified by legends $e_1$ and $e_2$ in Fig. 1 are indicated by wave forms $e_1$ and $e_2$. The output of the limiter is applied to the grid of pentode 12 which is known as a "drooler" and which forms a saw-tooth wave generator circuit with its associated circuit elements. Drooler 12 is normally conducting, being at zero grid bias, and the plate is at about 30 volts positive. The negative signal is applied at the grid of drooler 12 to cut off the plate current abruptly, and the plate voltage begins an exponential rise with a time constant of about 5 microseconds determined mainly by plate resistor 13, capacitor 14, and the tube and wiring capacity to ground. At the end of the negative signal at the grid of drooler 12 the plate current is turned on and the plate voltage falls to its original value. The plate wave form ($e_3$ in Fig. 2) is a saw-tooth wave and is known as a drool. Obviously, the amplitude of the drool is proportional to the time duration of the input signal. The drool is fed to the grid of biased amplifier tube 15, the bias on which is so adjusted by potentiometer 16 that this amplifier tube turns on slightly before the drool reaches the level corresponding to 2 microseconds (indicated by line $a-b$ in Fig. 2). When amplifier tube 15 turns on, blocking oscillator tube 17 is triggered through the plate winding of pulse transformer 18 to produce a current flow in this winding of well known form represented as $i_1$ in Fig. 2. It is apparent that when a signal is less than 2 microseconds in duration, blocking oscillator tube 17 does not trigger, but when the signal is of 2 microseconds duration or more, blocking oscillator tube 17 triggers and draws current $i_1$.

An adjustable amount of the output signal from diode 11 through potentiometer 19 is applied to the grid of amplifier and inverter tube 20. The signal on the plate of tube 20 is differentiated by differentiating circuit 21 and is then impressed on the grid of amplifier tube 22. The differentiated signal is represented by wave form $e_4$ in Fig. 2. Amplifier tube 22 turns on blocking oscillator tube 23 in response to the differentiated voltage applied to the grid of amplifier tube 22. The plate circuit of blocking oscillator tube 23 then draws a current $i_2$ as shown by the similarly identified wave form in Fig. 2. The values of resistor 24 and capacitor 25 in the grid return of blocking oscillator tube 23 are so chosen that the waveform $i_2$ is substantially flat and about 3 microseconds long at the flat peak. This flat current wave will be delayed by an amount depending on the output of amplifier 22, in turn depending on the amplitude of the voltage wave from differentiating circuit 21. The wave form $i_2$ is shown by full and dotted lines in the opposing extreme limits of delay. For small voltage amplitudes from differentiating circuit 21 corresponding to weak signals received at input terminal 10, flat wave form $i_2$ is delayed as shown by the dotted line in Fig. 2; and for large voltage amplitudes corresponding to strong signals, the wave form is delayed less as shown by the full line. A signal of intervening magnitude will produce a wave delayed between the extreme positions.

Currents $i_1$ and $i_2$ are converted to voltage waves and summed in a summing circuit comprising 150 ohm resistor 26. The sum, represented by wave form $e_5$ in Fig. 2 is applied to the cathode of coincidence tube 28. This tube has its grid biased beyond cutoff so that it will only respond to a pulse voltage greater than line $c$—$d$ in Fig. 2 which exceeds the amplitude of the flat voltage wave developed by $i_2$. If both $i_1$ and $i_2$ exist, plate current flows in tube 28 forming the output trigger pulse represented by $e_6$ in Fig. 2. If only one, or neither $i_1$ and $i_2$ exist, tube 28 has no output, as the cutoff bias is not removed. Since the output trigger pulse occurs only when both $i_1$ and $i_2$ exist, it must have the correct delay because $i_1$ has the correct delay whenever $i_2$ exists, and the output trigger is timed with respect to $i_1$. As the signal amplitude decreases, $i_2$ moves over in time, but this has no effect on trigger pulse $e_6$ because $i_2$ is flat on top. It is true that $i_1$ is subject to a variable delay with weak signals near the threshold level, but potentiometer 19 is so adjusted that $i_2$ does not occur when these weak signals are present at the input of drooler 12. It may be noted that diode 29 is provided to function as a restorer to permit the cathode of tube 28 to return to ground immediately following termination of the current pulse in blocking oscillator 23.

It is thus apparent that the trigger to blocking oscillator 17 will not be allowed to initiate an output trigger from terminal 30 unless the input signal is of magnitude greater than that which subjects the trigger circuit to a variable delay; the decision on magnitude being made by the amplitude discriminator.

The embodiment in Fig. 3 is of more general application, the preceding embodiment being particularly applicable to beacons. The circuit in Fig. 3 receives an input trigger at terminal 10 and gives out a trigger at terminal 30 of either constant or zero (no trigger) amplitude with a constant delay between the leading edges of the input and output triggers. This circuit has no provision for noise such as the biased diode 11 of the preceding embodiment. However, such a diode may be used in the instant embodiment, if desired.

The upper portion of the circuit, namely, the amplitude discriminator, comprises amplifier and inverter 20, differentiating circuit 21, triggering amplifier 22, and blocking oscillator 23 as in the preceding embodiment. However, the pulse length discriminator of the preceding embodiment has been replaced by amplifier limiter tube 31 and 2.5 microsecond delay line 32. When tube 31 is cut off by the negative trigger applied at terminal 10, the abrupt rise in the plate potential of this tube is impressed on delay line 32 to raise the grid voltage of coincidence tube 33 as shown by wave forms $e_2$ and $e_3$ in Fig. 4. The voltage at the cathode of tube 33 is also reduced by the flat topped voltage wave developed across blocking oscillator load resistor 26 as in the preceding embodiment and represented by wave form $e_5$ in Fig. 4. The time of occurrence of the flat topped wave $e_5$ will depend as in the preceding embodiment on the magnitude of the voltage impressed on the blocking oscillator. However, if this wave does occur, the occurrence will be coincident with voltage $e_3$ impressed on the grid of the coincidence tube, and a negative output trigger will appear at the plate of the coincidence tube and will be available as $e_6$ at terminal 30. This trigger, when it occurs, will have a constant delay with respect to the input trigger applied to the circuit. It is essential to have amplifier limiter 31 limit for a smaller signal than will trigger blocking oscillator 23. Otherwise the output trigger at terminal 30 will not be of constant amplitude.

The foregoing description of two embodiments of this invention should in no way limit the scope of this invention to any degree other than imposed by the following claims.

What is claimed is:

1. An electronic constant delay circuit for producing a constant delay between an output trigger and the leading edge of an input pulse where input pulses of widely varied amplitudes are to be accommodated, comprising an input terminal, a sawtooth generator coupled to said input terminal, a pulse generator, means coupling said pulse generator to the output of said sawtooth generator, said pulse generator being acutated when the output of said sawtooth generator attains a predetermined amplitude, an amplifier coupled to said input terminal, the output of said amplifier being impressed upon a diffferentiator, a rectangular wave generator, said rectangular wave generator being actuated by the output of said differentiator, and coincidence means responsive only to the joint presence of the output of said pulse generator and the output of said rectangular wave generator for providing an output trigger.

2. An electronic circuit for producing a constant delay between an output trigger and the leading edge of an input pulse where input pulses of widely varied amplitudes are to be accommodated, comprising, a normally conducting electron tube adapted to be cut off by an input pulse, means coupled to said electron tube for deriving a first pulse delayed in time from the leading edge of said input pulse, an amplifier sensitive to input pulses above a predetermined amplitude level, a differentiator coupled to the output of said amplifier, a rectangular wave generator, means for amplifying the output of said differentiator and impressing said amplified output upon the input of said generator, the output of said generator being of sufficient duration so that a portion of said output is coincident with said first pulse, and an output trigger circuit responsive only to the concurrent occurrence of said first pulse and said generator output.

3. An electronic circuit for producing a constant delay between an output trigger and the leading edge of an input pulse where input pulses of widely varied amplitudes are to be accommodated, comprising, a normally conducting electron tube adapted to be cut off by an input pulse, a delay line coupled to the plate circuit of said electron tube for deriving a first pulse delayed in time from the leading edge of said input pulse, an amplifier sensitive to input pulses above a predetermined amplitude level, a differentiator coupled to the output of said amplifier, a rectangular wave generator, means for amplifying the output of said differentiator and impressing said amplified output upon the control circuit of said generator, the output of said generator being of sufficient duration so that a portion of said output is coincident with said first pulse, and a coincidence circuit responsive to the joint occurrence of said first pulse and said generator output for producing an output trigger, said normally conducting electron tube being connected to limit for input pulses below the amplitude level of input pulses necessary to actuate said rectangular wave generator.

References Cited in the file of this patent

UNITED STATES PATENTS

| | | |
|---|---|---|
| 1,979,484 | Mathes | Nov. 6, 1934 |
| 2,359,447 | Seeley | Oct. 3, 1944 |
| 2,407,505 | Michel | Sept. 10, 1946 |
| 2,418,127 | Labin | Apr. 1, 1947 |
| 2,419,548 | Grieg | Apr. 29, 1947 |
| 2,434,937 | Labin et al. | Jan. 27, 1948 |
| 2,489,297 | Labin et al. | Nov. 29, 1949 |
| 2,534,264 | Hoeppner | Dec. 19, 1950 |